UNITED STATES PATENT OFFICE.

GRANT HAMMOND, OF SAN FRANCISCO, CALIFORNIA, ASSIGNOR OF ONE-HALF TO THOMAS FLINT, JR., OF SAN JUAN, CALIFORNIA.

FLUX FOR SOLDERING ALUMINIUM.

SPECIFICATION forming part of Letters Patent No. 598,340, dated February 1, 1898.

Application filed June 18, 1897. Serial No. 641,369. (No specimens.)

*To all whom it may concern:*

Be it known that I, GRANT HAMMOND, a citizen of the United States, residing in the city and county of San Francisco, State of California, have invented an Improvement in Fluxes for Soldering Aluminium; and I hereby declare the following to be a full, clear, and exact description of the same.

My invention relates to fluxes which are especially adapted for the purpose of soldering aluminium together or to other metals. It consists of iodin or the iodids of tin or mercury, either singly or combined with a hydrocarbon, such as vaseline, or other suitable form which it may be found desirable to use with the iodin.

The parts to be soldered are first scraped thoroughly clean and bright and the flux applied by placing the hydrocarbon upon the joint. Then place the solder thereon, and afterward add the iodin or iodid by sprinkling along the joint or otherwise. The flux may also be applied by mixing the hydrocarbon and iodin or iodid together, forming a paste or paint, and then applying along the seam, then placing the solder thereon.

Aluminium can also be soldered or brazed by using iodin as a flux without being combined with a hydrocarbon. This is of great importance in the making of aluminium tubing, as the metal after being rolled into shape can be brazed together, thus cheapening the manufacturing cost of the same.

The process is as follows: Scrape the edges of the aluminium thoroughly clean and bright and place a thin strip of solder the whole length, and, making a paste of the iodin, place it along the seam. The whole must now be heated in a clean fire or oven until a union has taken place.

By the use of this flux aluminium can be soldered to itself or any other metal except iron without any of the so-called "tinning" or other preliminary processes, and the joint can be made easily and as strong as any soldered joint.

Match-boxes, cigar-cases, and like small implements may be made of aluminium and the meeting edges successfully soldered by the use of this flux and a suitable solder. Brass springs, hinges, and other small articles of other metals can in the same manner be soldered to the aluminium.

I have found that a solder composed, essentially, of tin, silver, zinc, and aluminium is most satisfactory, being strong and tough, and it has the advantage that the joints will not become weak and eventually separate by reason of the electrical or chemical action which frequently takes place between aluminium and the materials of ordinary solders.

I claim—

1. A flux for soldering and brazing aluminium consisting of iodin and a hydrocarbon.

2. Iodin and iodids of tin and mercury as a flux for soldering and brazing aluminium.

3. A flux for soldering aluminium consisting of iodin, iodids of tin and mercury, and a hydrocarbon of the character of vaseline.

In witness whereof I have hereunto set my hand.

GRANT HAMMOND.

Witnesses:
S. H. NOURSE,
JESSIE C. BRODIE.